UNITED STATES PATENT OFFICE.

SAMUEL S. WALES, OF PITTSBURGH, PENNSYLVANIA.

MANUFACTURE OF STEEL.

1,282,660.

Specification of Letters Patent. Patented Oct. 22, 1918.

No Drawing. Application filed August 3, 1917. Serial No. 184,277.

*To all whom it may concern:*

Be it known that I, SAMUEL S. WALES, a citizen of the United States, and resident of Pittsburgh, in the county of Allegheny and State of Pennsylvania, have invented certain new and useful Improvements in the Manufacture of Steel, of which the following is a specification.

This invention has relation to the manufacture of steel in electric furnaces, and more particularly at small or isolated plants where molten metal is not available for use in making up the charges for the electric furnaces.

One object of the invention is to provide an improved process of making steel in electric furnaces wherein the use of scrap in the form of a unitary pre-heated mass is made possible without prohibitive increase in the cost, and whereby the usual "boring down" action of the electrodes and resultant formation of short circuits within the furnace and "surges" on the circuit supplying electric current to the furnace, are avoided and overcome.

Another object of my invention is to provide a novel process of making steel in electric furnaces whereby a coalesced and pre-heated charge is provided in the most favorable condition for rapidly melting and refining the charge within the electric furnace, and wherein the expenditure of electric energy and time required in melting the metal and refining the bath in the electric furnace are lessened and reduced to a minimum.

A further object of this invention is the provision of an improved method of making steel whereby the formation within the furnaces of charges of coherent and pre-heated metal is made possible without the use of molten pig iron or open-hearth steel in the preparation of the charges.

Still further objects of my invention will become apparent in the detailed description of the improved process to be made hereinafter.

In carrying out the steps of my novel process of making steel in an electric furnace, charges formed of cold scrap and molten metal, preferably a semi-steel, are used and a cupola will be employed to provide the necessary supply of molten metal. The cupola may be conveniently located adjacent to the electric furnaces in position to deliver the molten metal by gravity, through suitable troughs or runners from the cupola or cupolas to the furnace, as will be readily understood. When necessary, the cupola may be located at a distance from the electric furnace, in such case a ladle being employed in transferring the molten metal from the cupola to the furnace, as also will be readily understood.

In practising my invention the cupola or a plurality of cupolas will be utilized to melt steel scrap or a mixture of pig iron and steel scrap in such proportions as are desired, preferably such as will supply a molten semi-steel having a carbon content of about 2 per cent.

A quantity of solid steel scrap is charged into the electric furnace and a quantity of molten semi-steel from the cupola is then poured into the furnace and thereby mixed with the cold scrap.

The molten semi-steel will fill up the voids in the solid scrap within the electric furnace and a rapid transfer of heat from the highly heated molten metal to the relatively cold scrap will be effected. The result of this transfer of heat is to rapidly increase the temperature of the scrap by its intimate contact with the molten semi-steel with considerable lowering in the temperature of the semi-steel, but the so-formed charge will retain its sensible heat and will coalesce into a unitary heated mass, in the most desirable and best condition for the economical application of the electric current used in re-melting and refining the charge within the electric furnace.

The scrap and the semi-steel will be charged into the furnace as rapidly and at as frequent intervals as possible to avoid loss of heat and wide variations in the temperature of the interior of the furnace, in the successive steel making operations.

In making up the successive "heats" or charges for the furnace a relatively small amount of solid scrap and a predominant amount of molten semi-steel will be used, ordinarily from 25 to 30 per cent. of scrap and 75 to 70 per cent. molten semi-steel being employed, the carbon content of the molten semi-steel being about 2 per cent. The proportion of solid scrap may vary between 25 and 75 per cent. depending upon the kind of scrap used. In any case sufficient molten metal to substantially cover the cold scrap should be employed, although a lesser amount may be used at the expense of loss in electrical energy and increase in the time required in melting such charges.

The coalesced and still heated mass is then melted and the molten metal is refined by the application of electric current, additions of reducing agents being made in the usual and well known manner, and after the charge is refined to the desired composition and is brought to the right temperature the furnace is tapped and the molten steel is thereby removed into a ladle from which it is later teemed into molds to form ingots or other castings.

When required, the furnace bottom and lining can then be repaired, and as occasion demands, the furnace will be relined throughout.

A fresh charge of scrap and molten metal is then put into the electric furnace in the way which has been described and the other heretofore described steps are again repeated.

The advantages of my invention, which will be readily appreciated by those skilled in the art, arise from the use of cold, i. e., solid steel scrap and molten semi-steel in forming coalesced and pre-heated "heats" or charges within the electric furnace, and in the prevention of the losses in electrical energy ordinarily present in the melting of cold scrap.

By employing molten semi-steel I am enabled to provide molten metal having a carbon content less than that of pig iron at small or isolated electric furnace plants in forming the charges therefor in a cheap and economical manner.

The use of a molten semi-steel, in forming the charges, enables a pre-heated coalesced charge being formed, which lessens the cost of refining by reducing the electrical energy and time required.

By using a cupola to supply molten semi-steel in forming the charges, a supply of molten metal is made possible, where the cost of installing and operating an open-hearth plant for such purpose would be prohibitive.

Modifications in the steps of my improved process may be made without departing from my invention. The relative amounts of scrap and molten semi-steel may be widely varied, and the composition of the scrap and molten semi-steel also may be varied. The scrap may be added in part or in whole, either before or after the molten semi-steel has been charged into the electric furnace, and other variations may be made within the scope of the claims.

I claim:—

1. The method of making steel which consists in charging solid scrap metal into an electric furnace, then adding molten metal thereto and thereby forming a coherent heated mass, then melting and refining the mass within the furnace and thereby forming steel of the desired composition, and then tapping.

2. The method of making steel which consists in charging from 25 to 75 per cent. solid scrap metal into an electric furnace, then adding between 25 and 75 per cent. molten metal thereto and thereby forming a coherent heated mass, then melting and refining the mass within the furnace and thereby forming steel of the desired composition, and then tapping.

3. The method of making steel which consists in charging solid scrap and molten semi-steel into an electric furnace to form a coalesced heated mass and then melting and refining the mass by the application of electric heat, and tapping the furnace.

4. The method of making steel which consists in charging solid scrap and molten semi-steel into an electric furnace to form a coalesced heated mass, then melting the mass by the application of electric heat, adding reducing elements and refining the molten metal to form steel of the desired composition, and tapping the furnace.

5. The method of making steel which consists in melting steel scrap in a cupola, charging the molten cupola metal and solid scrap into an electric furnace and thereby forming a unitary pre-heated mass, then melting and refining the mass into steel by the application of electric current, and tapping the furnace and teeming the steel.

6. The method of making steel which consists in charging from 25 to 75 per cent. cold scrap and 75 to 25 per cent. molten semi-steel into an electrical furnace to heat the scrap and form a heated unitary mass, then applying electric current to the mass to melt and refine the metal, and then tapping the furnace and teeming the steel into molds.

In testimony whereof I have hereunto set my hand.

SAMUEL S. WALES.